Figure 4:
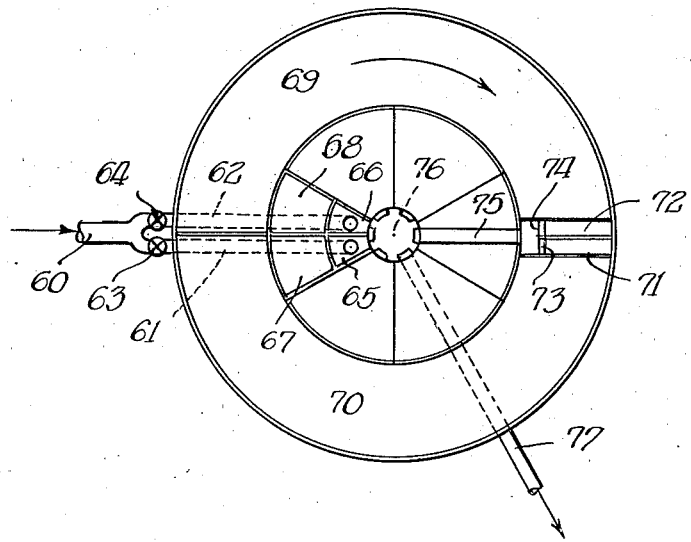

Feb. 26, 1946.　　　R. E. SEDDIG　　　2,395,508
LIQUID TREATMENT
Filed Oct. 6, 1941　　　3 Sheets-Sheet 1
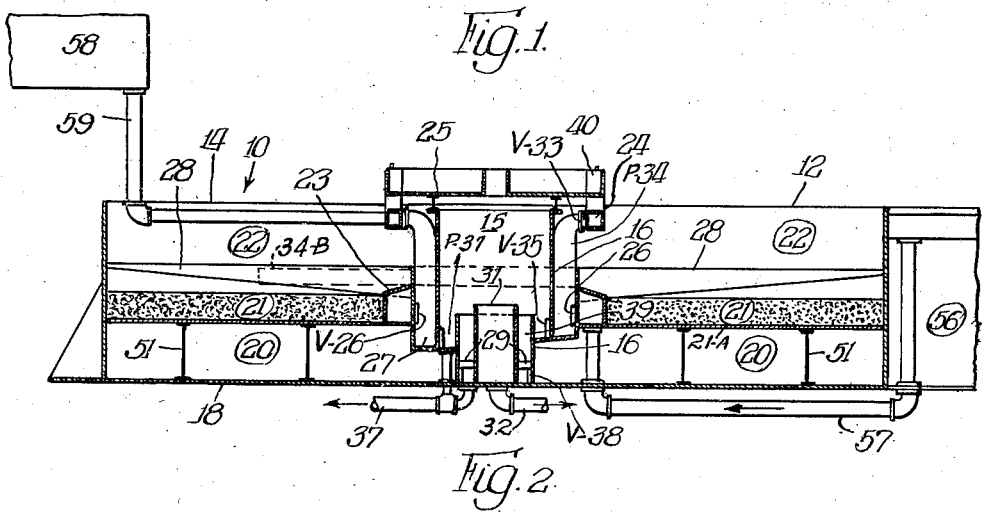
INVENTOR.
Robert E. Seddig,
BY
F. D. Prager  atty.

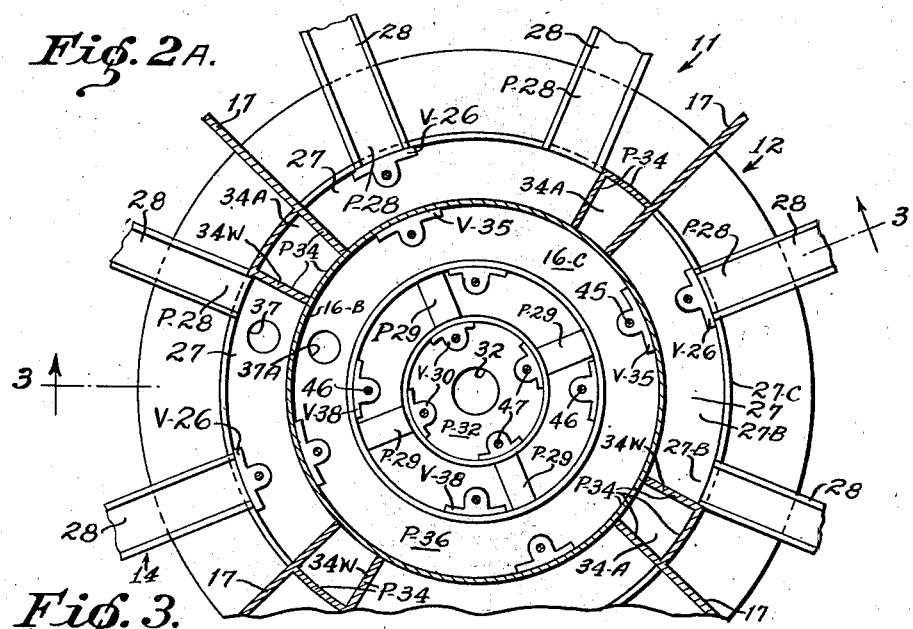
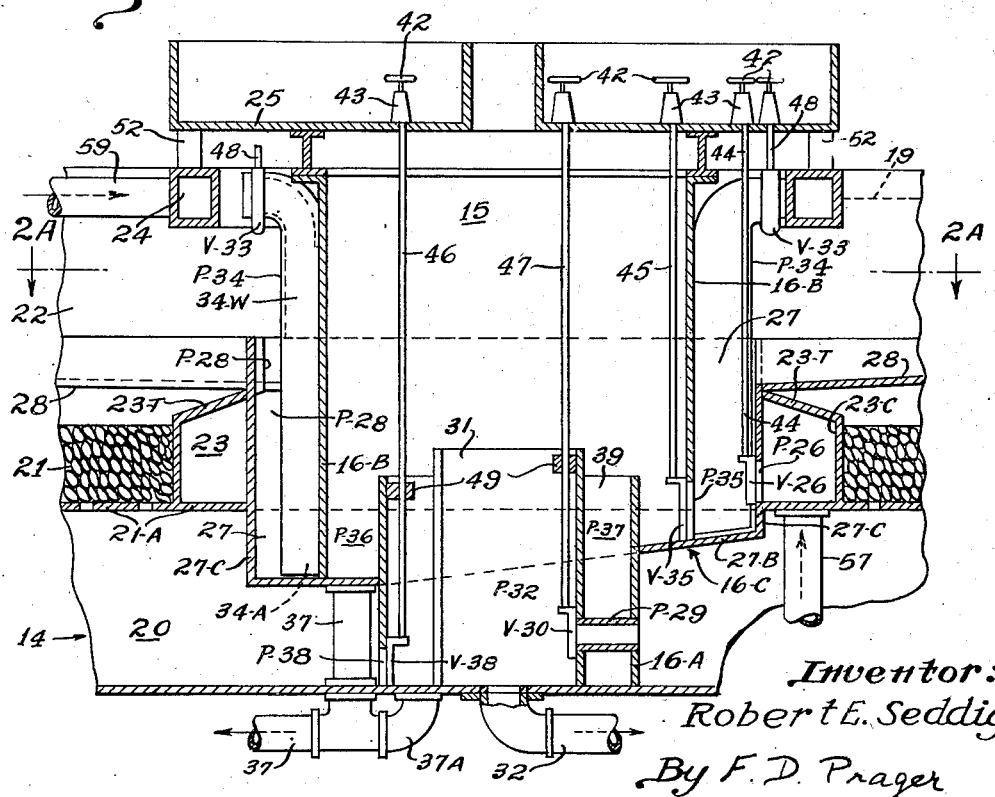

Patented Feb. 26, 1946

2,395,508

UNITED STATES PATENT OFFICE 2,395,508

LIQUID TREATMENT

Robert E. Seddig, Chicago, Ill., assignor to Graver Tank & Mfg. Co., East Chicago, Ill., a corporation of Delaware Application October 6, 1941, Serial No. 413,751

7 Claims. (Cl. 210—122)

This invention relates to liquid treatment, particularly, filtration of water for municipal supply.

One of its objects is, to provide apparatus which is efficient, simple, and inexpensive. Other objects are, to combine a plurality of independent filters in a tank of the smallest possible size, to provide the greatest possible operating capacity, to conserve head, to facilitate the operation, to allow easy inspection of the bed and of the various flows, to simplify the design and construction, and to eliminate shortcomings of earlier designs. Still other objects will appear hereinafter.

Filters for municipal supply are usually, and desirably, operated from a platform above the water level. The operator can observe the filter while he manipulates the valve setting devices on this platform, which are mechanically, electrically or otherwise connected with the filter valves. The valves have frequently been placed on pipes, forming a so-called filter front, in a gallery or vault below the operating platform. In other instances, the filter flows have been conducted through open channels, standpipes or basins, controlled by sluice gates or the like, or some flows have been passed through open conduits while others have been confined in pipes. The complete plant composed of filters and pipe gallery or channels, with superstructure, has either been rectangular in plan view, or sometimes circular, or in rare instances, triangular, polygonal, or of some other shape.

Open conduits for the filter flows have the great advantage that they allow continuous inspection of all the water in the plant, and timely detection of deposits and the like. In this they are vastly superior to pipes, regardless whether so-called sampling lines may be provided for inspection of samples of the water on the operating platform. It is one object of my invention to make full use of open conduits. In sand filters, there are usually five separate and distinct flows, identified as influent, effluent, backwash supply, waste, and filter drainage flows. In some instances, I may construct the conduits for all of these flows as open channels or standpipes. In other instances, the conduits leading to the filter, especially the backwash pressure conduit, may be pipes, while other conduits are open. The design can be modified in a number of ways, in this respect.

Circular plants have considerable advantages over rectangular ones; for instance, they are easier to oversee from a central point; they are cheaper to construct where excavation work is required; they need less material for walls, per unit of area; they keep the water cooler in the summer, and protect it better against freezing temperatures in the winter. Heretofore, however, the use of circular plants has been retarded by difficulties in connection with conduits and controls. In some instances, there has been provided a large, central pipe vault, with a maze of pipes twisting around therein and interconnecting the various inlets and outlets of the surrounding filters; involving long trips from the operating platform to the filter valves and vice versa; also involving great expense for numerous special fittings and the like, and considerable losses of head due to long and tortuous flows. In other instances, valves or gates had to be operated by rods passing through stuffing boxes in solid walls, or with miter gears interposed, or subject to other difficulties or complications. It is one object of my invention to overcome those difficulties and to eliminate those complications in a circular plant.

Still another object is to provide a complete treatment plant comprising a highly efficient clarifier, a series of filters, and an efficient collecting well for such filters, communicating with said clarifier.

The manner in which these several objects are achieved will be understood on consideration of the detailed description which follows, in connection with the drawings.

Figure 5:
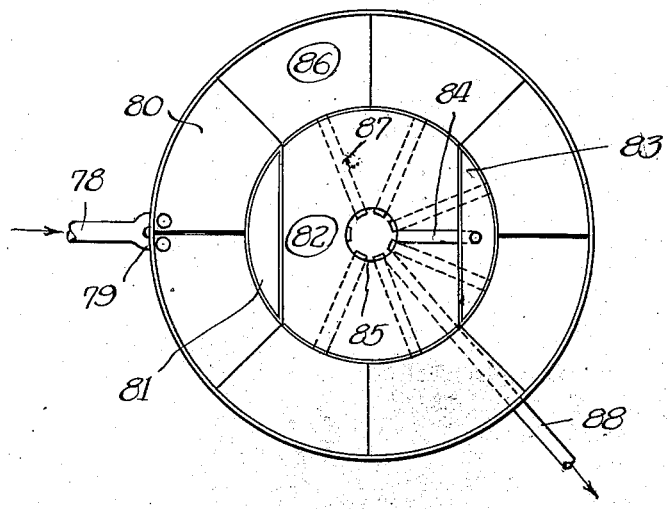

Figure 1 is a diagrammatical sectional elevation of one embodiment of my invention. Figure 2 is a diagrammatical plan view of the apparatus of Figure 1. Figure 2—A is a sectional view, on a larger scale than that of Figures 1 and 2, of central portions of an embodiment hereof, the section being taken along lines 2—A—2—A in Figure 3, and the apparatus being slightly modified, as to the valve actuating means forming part thereof. Figure 3 is a sectional elevation of the apparatus of Figure 2—A, the section being taken along lines 3—3 in Figure 2—A. Figures 4 and 5 show modified embodiments in plan view.

The filter plant or tank 10 has a main collecting well 15 centrally and concentrically installed therein. This well is surrounded by four filter units 11, 12, 13 and 14 forming part of the plant. The filter units are separated from the collecting well by an outer wall of said well. This wall, as shown, comprises two superposed cylindrical portions 16—A and 16—B, interconnected by an annular portion 16—C, and forming an upwardly expanding standpipe, the lower portion 16—A having a relatively small diameter while the upper portion 16—B has a relatively larger diameter. Vertical walls, partitions or bulkheads 17 are secured to the outside of the wall 16—A, 16—B and 16—C, and radiate outwardly therefrom to the wall of the tank 10. The filter units are separated from one another by these bulkheads, which extend from the bottom 18 of the filter plant to a level above the water level 19; this water level being established during filtration service, as usual, adjacent the top of the tank.

Each filter, as shown, has an underdrain chamber 20, a bed of sand or other granular material 21 supported on a horizontal, perforated plate 21—A above the underdrain, and a freeboard space 22 above the bed. The plates 21—A are installed slightly above the aforementioned plate 16—C, in manner to be described. Each filter communicates with the central collecting well 15, and also with water distributor ducts 23, 24, through passages and associated valves, to be described presently, so that each filter may be operated and reconditioned separately and independently of the other filters, by control means located on a central operating platform 25 above the filters. The two distributor ducts are concentric with the well and are shown as substantially annular ducts surrounding the well.

The well 15 carries, on the outside thereof, arcuate launders 27, serving as backwash launders in manner known to the art. The bottom of each launder is formed by means of a horizontal bottom plate 27—B extending outwardly from the aforementioned plate 16—C and having the shape of a ring sector. A vertical, cylindrical plate 27—C extends from the outer edges of the plates 27—B to a level between the top of the filter bed and the top of the tank, to form the outer walls of the launders. Gaps or openings 34—A are left between the horizontal launder bottom plates 27—B, while the cylindrical launder wall plate 27—C is substantially continuous, and has no gaps or openings corresponding to 34—A. The backwash launders 27 are separated from one another by vertical passages or pipes P—34, discharging through said openings 34—A. Each pipe or passage P—34 is formed and confined by and between portions of the vertical walls 16—B, 17, 27—C, and additional vertical walls 34—W. Thus the central well 15 is surrounded by launders 27 separated from one another by vertical pipes P—34 and each filter unit 11, 12, 13 and 14 has one launder 27 and one vertical pipe P—34 associated therewith.

One of the water distributor ducts is the influent distributor 23 which surrounds a lower portion of the cylindrical launder wall 27—C; it is formed by a further cylindrical wall 23—C upwardly extending from the horizontal plate 21—A, and an annular top plate 23—T, extending between the top of the wall 23—C and the outside of the launder wall 27—C; the plate 21—A as well as the other walls of the distributor duct 23 being imperforate insofar as they form said distributor duct, while the remainder of the underdrain plate 21—A, outside of the distributor duct is perforated as mentioned. The second or backwash distributor duct 24 is installed adjacent the top of the tank, surrounding the well 15. The four backwash branch pipes or passages P—34 extend inwardly away from the distributor 24 and vertically downward between the launders 27, to the discharge openings or gaps 34—A communicating with the underdrain chambers 20.

Each launder 27 is open on top and communicates with the freeboard chamber 22 through this top, which forms a passage P—27. Furthermore each launder 27 has one or several side passages or slots P—28 opening through the launder wall 27—C above the influent distributor 23. A conventional wash trough 28 communicates with each passage P—28 and extends outwardly from the launder wall 27—C, over the filter bed 21.

Within the well 15, and concentrically therewith, a cylindrical wall, standpipe or annular partition 39 extends from the inner edge of the wall portion 16—C, upwardly continuing the lower, smaller wall portion 16—A, and forming an annular collecting well or conduit P—36, open on top and defined by the walls 16—B, 16—C and 39. Furthermore, a cylindrical wall, standpipe or annular partition 31, of smaller diameter than the lower wall portion 16—A, extends upwardly from the tank bottom 18, within the well 15 and concentrically therewith, so that a further collecting well or conduit P—37 is formed between the partitions 39 and 31, and a central collecting well or conduit P—32 is defined by and within the innermost partition 31.

Assuming now that a filter unit, for instance, filter 14 is in service, flows are established as follows: The influent distributor 23 discharges through an opening P—26, formed in the cylindrical wall 27—C and controlled by a vertical valve gate V—26, into the launder 27 and from there through the open top passage P—27 into the freeboard chamber 22 of filter 14. The water then percolates through the bed 21 of filter 14, incident to which it is rid of impurities. Clear water arrives in the underdrain 20 of filter 14, and flows through a short conduit P—29 (through wall 16—A, across well P—37, and through wall 31) into the central, collecting clear well P—32, from the bottom of which it passes to further storage or service through the outlet header 32. An effluent valve gate V—30 is interposed on the end of conduit P—29 along the cylindrical wall 31, within the clear well P—32, to control the flow into this well.

Assuming now that the filter 12 is being backwashed, the flows in this filter are as follows: The backwash supply distributor 24, being a boxed pipe circling the collecting well 15, above the filter bed, discharges through the backwash valve V—33, associated with filter 12, through the downwardly extending conduit P—34, joining this valve, and through an opening 34—A at the bottom of said conduit P—34 into the underdrain 20, from whence the water rises through the bed 21, into the freeboard space 22, of filter 12. The spent backwash water, which has expanded and agitated the filter bed 21, and which carries, in suspension, the impurities removed from the bed, is collected in the back wash troughs 28 and launder 27 of this filter. The launder has a waste passage P—35 and associated waste valve V—35, through which the spent backwash water enters the waste header channel P—36, forming a further separate collecting well or part of the main collecting well 15, to be finally withdrawn by a drain pipe 37, joining the bottom of the waste channel.

After the backwash, the filter may either be restored to service at once, or may be allowed to rest, or in the best operation, there may be a period of filtering to waste. This involves normal filter flow, as hereinabove described, from the influent header 23 to the underdrain 20; however, the filtered water, or so-called rinse water, is withdrawn through a relatively small rinse passage P—38 and rinse valve V—38 into the rinse collector channel P—37, which surrounds the central clear well P—32, and is in turn surrounded by the waste header P—36.

The central collecting well 15 has one compartment for each of the aforementioned flows, concentrically arranged; the service compartment or clear well P—32 being innermost, the rinse compartment or channel P—37 surrounding it, and the backwash compartment or waste channel P—36 surrounding the latter. This arrangement, of course, is subject to change; for instance, the rinse channel could be innermost, and the clear well next, providing greater area, but possibly somewhat less visibility, for the clear well. The filters, with their individual troughs 28, and launders 27, surround the collecting well as a whole. The incoming, distributing headers 23 and 24 may be placed outside of the collecting well 15, in the filters, as shown; or they may find room at some other points.

Those distributing headers may be placed at various elevations, but an arrangement substantially as shown and described is preferred, since it facilitates construction and operation of the necessary valves and associated control members. Similarly, the depth of the several standpipes forming the collecting well can be varied, but again the arrangement shown is preferred. It provides a clear well P—32 and rinse well P—37, communicating with the underdrains 20 and extending upwardly from the bottom 18; and a backwash waste well P—36, communicating with the freeboard spaces 22, and located at an elevated level. The bottom of this waste well P—36, as well as those of the individual wash troughs 28 and launders 27, should have a sufficient slope to cause a rapid flow, flushing out the impurities. Thus, the bottom 16—C of the waste collecting well may spiral down around the rinse part P—37 of the collecting well; and in turn, the bottoms 27—B of each of the launders 27 may form spiral arcs along the wall 16—B of the collecting well. This wall 16—B, which separates the individual filters from the collecting well, should extend to a point above the water level 19, established during filtration service. On the other hand, the interior standpipes forming the rinse chamber P—37 and the clear well P—32 need not extend to the top. Several feet of head are lost in filtering and rinsing. Therefore, material can be saved, and visibility increased, by having the outer wall of the rinse channel, 39, extend only to some point intermediate the bottom 16—C of the waste channel P—36 and the top of the plant. The rinse channel P—37 may then be drained either through a separate L 37—A joining the waste header 37, as shown; or it may simply overflow into the waste channel P—36. The clear well P—32 will preferably extend at least a small distance above the rinse well P—37, in order to avoid pollution of the water intended for service.

In operation, then, the central clear well will have filtered water in it as long as filtration service continues in any filter or filters of the plant; and the level of the water in this clear well will be so far below the top level 19, as the average loss of head, in the filters connected to this well, may indicate. The other collecting wells or channels P—37 and P—36 will have flows passing through the same as often, and as long as any filter, or filters, may be backwashed, or rinsed.

In filter operation, it is important to conserve as much as possible of the potential and static head of the water, which generally has to be pumped from a source to the plant, and again to be pumped from the plant to a point of use. In service, a great and increasing amount of head is unavoidably lost due to the friction of the filter bed, with the impurities collected therein, and due to the necessary inlet and outlet valves. This is true of all filters, and the filter of my invention is no exception in this respect. Additional losses, due to friction in pipes of excessive length, unnecessary bends, restrictions and the like, should be eliminated, as far as sound design and operation may allow. Those additional losses are indeed, at an absolute minimum in my improved filter. The service flow has no restrictions or other appreciable sources of loss of head interposed on it, aside from necessary valves and filter bed; the channels 27, 22, 20, P—29, and P—32 can and will be made of such size and shape as to offer practically no resistance. The same thing is true of the distributing and collecting pipes or headers 23 and 32 for this flow.

Similarly, unnecessary and excessive losses of head, incident to backwashing, are avoided by the construction of the passages for the backwash flow, that is, the large conduits P—34, 20, 28, 27 and P—36, aside from the headers 24 and 37 for backwash flow. Concerning, in particular, the incoming backwash branch conduit P—34, it will be seen from Figure 2—A that this conduit, in my preferred embodiment, finds ample and convenient space in the large-sized gaps which are formed between the backwash launders 27 of the individual filters. The launders 27 and conduits P—34 may alternate around the wall 16 of the center well 15. In some instances, the wash water branch pipes P—34, leading down from the header 24, may communicate both with the underdrain 20, and with pipes 34—B discharging adjacent the surface of the filter bed 21, so that a surface wash may be applied.

Filter operation may be either manual or automatic, and thus I may either provide control and timer tables 40, containing automatic program controllers, adjustable and controllable by knobs, pushbuttons, or other similar means 41, which are well known to the art (Figures 1, 2), or I may use hand wheels 42 on pedestals 43, or the like (Figure 3). In either event such manual or automatic controls, their adjustment members, indicators, and other auxiliary attachments and parts, are conveniently and desirably located on the operating platform 25, from which the filters 11, 12, 13, 14, the clear well P—32, the backwash launders 27, the backwash collector channel P—36, and the rinse collector channel P—37 can be observed, due to the open construction and suitable circular arrangement thereof.

Not only filter inspection, but also the operation and maintenance of the filters, from this central operating platform on top of the plant, are greatly facilitated by the open construction of most of the conduits—particularly due to the use of vertical standpipes and boxed conduits, as illustrated, which allow the insertion of sluice gates or other valves, operating in vertical planes, and actuated by vertical rods. For instance, a vertical rod 44 runs unobstructedly from the inlet valve or sluice gate V—26 of filter 12 to the corresponding operating means, which as shown is a handwheel 42, upon the operating platform 25 (Fig. 3). This rod 44 runs parallel with the vertical wall 27—C of the launder 27 of filter 12. Three other valve operating rods belonging to the same filter are shown at 45, 46, and 47, connected with the waste, rinse, and effluent valves respectively, and running in the open, vertical channels for waste, rinse and effluent water, respectively. The backwash branch conduit, when constructed as a closed pressure conduit, may be controlled by a gate valve V—33 actuated by a vertical rod 48 which avoids all solid obstructions. The rods 44, 45, 46, 47 and 48 may pass through guiding sleeves 49, attached to the walls of the collector well and distributor channels by suitable brackets or the like.

The vertical walls of the collecting well, of the several compartments therein, and of the distributing conduits 23, 24, or some of them, may serve as supporting members for the filter bed, the operating platform, and other component parts of the plant, including the radial partitions 17, which in turn serve as braces for the standpipe or pipes 16, especially if the structure is made of steel. Additional supports 51 may be provided in the underdrain chamber 20 and elsewhere; and some elements, such as the backwash header 24, may support the operating platform or other top structure by members 52; the backwash header itself being supported by the bulkheads 17 secured to the well 15, and thus at least being partly supported by the well. Usually there will be a walkway 53 giving access to the operating platform 25, as shown in Figure 2.

The entire filter plant, and particularly the collecting well and center piece 15, are very compact and strongly built; they save a maximum of space and material; and they reduce the necessary piping and fittings to a minimum; aside from other advantages, as mentioned. They can be built from any common material, but I prefer steel. The task of assembling the complete plant by welding is greatly simplified and made much more economical by the use of the open vertical channels, as herein proposed, since these channels or conduit structures, comprising parts 16, 23—A, 24, 25, 27—A, P—29, 31, P—34, 39 and associated members form a useful subassembly or article of manufacture which can be pre-assembled, and since the matching of pipes and fittings with corresponding holes in the several walls is practically eliminated, and other benefits are obtained.

In a complete filter plant, there may be some pretreatment of the water prior to filtration, for instance, by aeration, chemical treatment, coagulation, sedimentation, or combinations of such treatments. One or several basins 56 for such treatment may surround the filter plant 10, and communicate with the influent header 23 through a conduit 57 joining either the bottom, or the top, or the side of the header 23. A backwash supply tank 58 may be installed at a suitable point, and feed the backwash header 24 through a conduit 59.

In the modified plant according to Figure 4 the raw water from source 60 may pass through either one of two conduits 61 and 62, controlled by valves 63 and 64, respectively, to either one of two rising wells 65 and 66, further to chemical mixing basins 67 and 68, and settling basins 69 and 70, discharging into troughs 71 and 72 controlled by gates 73 and 74. A single conduit 75, desirably in the form of an open trough at the same approximate level with the settler troughs 71 and 72, brings the water to a central collecting well 76, with minimum loss of head and wastage of piping. The design and operation of the collecting well 76, and associated parts, may be substantially the same as those described in detail above. The central clear well discharges to storage or service through a main 77.

In the further modification of Figure 5, the raw water from source 78 may pass through conduits 79 to the bottom of mixing or aerating basins 80, and further to a trough 81 having a weir edge at the top of such basins, and another weir edge, at a somewhat lower level, discharging into a central clarifier basin 82. This clarifier in turn may discharge into an outlet trough 83 and conduit 84, to a center well 85 similar to those above described, feeding and draining a series of filters 86, which surround the clarifier, through conduits 87 suitably installed in the top, or bottom, or both. The clear well again discharges through a main 88.

Many other modifications can be made. For instance, instead of sand filters, there may be filters of anthracite, activated carbon, zeolite, or other materials, or combinations thereof. Auxiliary brine chambers and the like may be located in some of the compartments. The liquid under treatment may not be water for municipal use, but an industrial supply, process liquor, or waste; it may be sewage, or any other aqueous liquid.

I claim:

1. In water treating apparatus, a circular tank structure, a flat bottom thereof, an annular, concentric partition extending from the bottom to the top of said tank structure, radial partitions extending from the bottom to the top of said tank structure and extending outward from said annular partition, horizontal partitions extending between pairs of said radial partitions, between the top and bottom of said tank structure, launders secured to the outside of said annular partition between pairs of said radial partitions, filter beds supported on said horizontal partitions and confined between said radial partitions, said several partitions being so arranged and secured to one another that the freeboard space above each filter bed permanently communicates with the respective launder whereas said freeboard spaces and the underdrain spaces below said filter beds are partitioned from each other and from the space within said annular partition, two annular water supply conduits concentric with said partitions, at least partly supported thereby and discharging respectively into said freeboard and underdrain spaces, at least two water collecting conduits open to the atmosphere and located on the inside of said annular partition, one of said collecting conduits being connected to said underdrain spaces and the other of said collecting conduits being connected to said launders, and means adapted to control the flow of water from and into said several conduits.

2. Apparatus according to claim 1 combined with a clarifier, said clarifier being concentric with said tank structure and comprising walls forming a bottom and a lateral enclosure, part of said walls being integral with parts of the circular tank structure, inlet means in said clarifier for liquid to be clarified, and outlet means in said clarifier spaced from said inlet means and discharging into one of said supply conduits.

3. Liquid treatment apparatus comprising a tank, a standpipe rising from the bottom to the top of said tank in a central part thereof and thereby forming a central well in said tank, partitions extending from said standpipe to the wall of said tank and rising from the bottom to the top of said tank, filterbeds disposed between such partitions above the bottom and below the top of said tank and thereby separating underdrains below said filterbeds from freeboard rooms above said filterbeds, a first liquid supply conduit, a second liquid supply conduit, additional standpipe means disposed within said central well and forming a plurality of liquid collecting wells therein, a first means for passage of liquid between said first supply conduit and each of said freeboard rooms, a second means for passage of liquid between said second supply conduit and each of said underdrains, a third means for passage of liquid between one of said liquid collecting wells and each of said underdrains, a fourth means for passage of liquid between another of said liquid collecting wells and each of said freeboard rooms, and liquid flow control means interposed on each of said means for passage of liquid.

4. Liquid treatment apparatus according to claim 3 wherein at least two of said additional standpipe means are disposed within said central well, forming at least three liquid collecting wells therein, and which apparatus comprises an additional means for passage of liquid between one of said liquid collecting wells and each of said underdrains.

5. Liquid treatment apparatus according to claim 3 wherein said second supply conduit is installed adjacent to the top of said tank, and which apparatus comprises a branch conduit extending between said second supply conduit and each of said underdrains adjacent to said standpipe.

6. Liquid treatment apparatus according to claim 3 comprising an additional conduit extending between said second supply conduit and each of said filterbeds, adjacent to the surface of the filterbed, and adapted to discharge liquid adjacent to the surface of the filterbed.

7. Apparatus accordling to claim 1 wherein at least some of said supply and collecting conduits have gate means interposed thereon, such gate means being vertically disposed adjacent to at least one of the partitions.

ROBERT E. SEDDIG.